US010766281B2

(12) United States Patent
Watanabe

(10) Patent No.: US 10,766,281 B2
(45) Date of Patent: Sep. 8, 2020

(54) PRINTER, INFORMATION PROCESSING DEVICE, AND A NON-TRANSITORY COMPUTER-READABLE RECORDING MEDIUM RECORDING AN INFORMATION PROCESSING PROGRAM

(71) Applicant: SEIKO EPSON CORPORATION, Tokyo (JP)

(72) Inventor: Ikumi Watanabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 15/794,119

(22) Filed: Oct. 26, 2017

(65) Prior Publication Data
US 2018/0141351 A1 May 24, 2018

(30) Foreign Application Priority Data
Nov. 21, 2016 (JP) .................................. 2016-225733

(51) Int. Cl.
*B41J 13/00* (2006.01)
*B65H 39/06* (2006.01)
(Continued)

(52) U.S. Cl.
CPC .......... *B41J 13/0009* (2013.01); *B65H 39/06* (2013.01); *B65H 43/00* (2013.01); *G06F 3/1204* (2013.01); *G06F 3/1205* (2013.01); *G06F 3/1255* (2013.01); *H04N 1/00525* (2013.01); *H04N 2201/0094* (2013.01)

(58) Field of Classification Search
CPC .................................................... B65H 39/06
See application file for complete search history.

(56) References Cited

U.S. PATENT DOCUMENTS

| 4,382,592 A | * | 5/1983 | Harding | .................... | B42C 1/12 227/105 |
| 2004/0130088 A1 | * | 7/2004 | Sato | ......................... | B65H 3/44 271/3.14 |

(Continued)

FOREIGN PATENT DOCUMENTS

| JP | H06-091969 A | 4/1994 |
| JP | 10-063143 A | 3/1998 |

(Continued)

OTHER PUBLICATIONS

The Extended European Search Report for the corresponding European Patent Application No. 17201093.6 dated Apr. 6, 2018.

*Primary Examiner* — Jennifer E Simmons
(74) *Attorney, Agent, or Firm* — Global IP Counselors, LLP

(57) ABSTRACT

A printer that improves user convenience for rotating collation printing is provided. In a printer having a rotating collation function, multiple paper feed ports configured to feed paper, an acquisition unit configured to acquire a user request, and a setting unit configured to enable or disable the rotating collation function, the setting unit sets the rotating collation function to enabled when the acquisition unit acquires a user request to enable the rotating collation function, a first paper of a specified size that is fed in a landscape orientation and a second paper of the specified size that is fed in a portrait orientation are set in multiple paper feed ports, and paper feed port selection is set to automatic.

14 Claims, 4 Drawing Sheets

(51) Int. Cl.
  *B65H 43/00* (2006.01)
  *H04N 1/00* (2006.01)
  *G06F 3/12* (2006.01)

(56) References Cited

U.S. PATENT DOCUMENTS

| | | | | |
|---|---|---|---|---|
| 2004/0153530 | A1* | 8/2004 | Machida | H04L 41/0803 709/220 |
| 2009/0180140 | A1* | 7/2009 | Kawamura | G06F 3/1255 358/1.15 |
| 2009/0244602 | A1* | 10/2009 | Suse | G03G 15/5087 358/1.15 |
| 2010/0188680 | A1* | 7/2010 | Xiao | G06F 3/1205 358/1.13 |
| 2013/0016386 | A1* | 1/2013 | Kawamoto | G06F 9/4411 358/1.13 |
| 2013/0187970 | A1* | 7/2013 | Inoue | B41J 2/12 347/14 |

FOREIGN PATENT DOCUMENTS

| | | | |
|---|---|---|---|
| JP | 2001-328739 | A | 11/2001 |
| JP | 2004-205846 | A | 7/2004 |
| JP | 2009-184144 | A | 8/2009 |
| JP | 2009-234715 | A | 10/2009 |
| JP | 2010-044677 | A | 2/2010 |

\* cited by examiner

PRINTER, INFORMATION PROCESSING DEVICE, AND A NON-TRANSITORY COMPUTER-READABLE RECORDING MEDIUM RECORDING AN INFORMATION PROCESSING PROGRAM

BACKGROUND

1. Technical Field

The present invention relates to a printer that improves user convenience for printing with a rotating collate function.

2. Related Art

Multifunction printers used in offices and convenience stores, for example, often have a rotating collation function. When the rotating collation function is enabled, the multifunction printer checks whether or not the printing conditions required for rotating collation are satisfied. For example, JP-A-2004-205846 describes a method of first confirming that a paper cassette that supplies paper in a landscape orientation, and a paper cassette that supplies paper in a portrait orientation, are both installed before starting printing in the rotating collation mode when the rotating collation function is enabled.

However, while the method described in JP-A-2004-205846 confirms that a paper cassette that supplies paper in a landscape orientation, and a paper cassette that supplies paper in a portrait orientation, are present before enabling the rotating collation function, the conditions for using the rotating collation function more effectively are insufficient in printers of the related art. Misprints are therefore common during actual rotating collation printing, printouts are not produced as desired by the user, and user convenience is poor during printing in a rotating collation mode.

SUMMARY

An objective of the invention is to provide a printer that can improve user convenience during rotating collation printing.

To achieve the foregoing objective, one aspect of the invention is a printing device having a rotating collation function, including: multiple paper feed ports configured to feed paper; an acquisition unit configured to acquire a user request; and a setting unit configured to enable or disable the rotating collation function; the setting unit setting the rotating collation function to enabled when the acquisition unit acquires a user request to enable the rotating collation function, a first paper of a specified size that is fed in a landscape orientation and a second paper of the specified size that is fed in a portrait orientation are set in multiple paper feed ports, and paper feed port selection is set to automatic.

This configuration can prevent misprints when printing using the rotating collation function, can produce printouts as desired by the user, and improve user convenience when using the rotating collation function.

Preferably in another aspect of the invention, the setting unit does not set the rotating collation function to enabled if either the first paper or the second paper is not set in the paper feed port when the acquisition unit acquires a user request to enable the rotating collation function.

This configuration can prevent misprints when printing using the rotating collation function.

Further preferably in another aspect of the invention, when the first paper and the second paper are set in paper feed ports, and paper feed port selection is not set to automatic, the setting unit changes paper feed port selection to Automatic and then enables the rotating collation function.

As a result, the settings for using the rotating collation function are automatically corrected, misprints can be prevented, and the operating burden of the user is reduced.

Further preferably in another aspect of the invention, when the first paper and the second paper are set in paper feed ports, the setting unit enables the rotating collation function if the document size is the specified size and the print ratio is set to 100%, and if the document size is the specified size and the print ratio is not set to 100%, changes the print ratio to 100% and then enables the rotating collation function.

As a result, the settings for using the rotating collation function are automatically corrected, misprints can be prevented, and the operating burden of the user is reduced.

Further preferably in another aspect of the invention, when the first paper and the second paper are set in paper feed ports, the setting unit enables the rotating collation function if the document size is not the specified size and print ratio selection is set to automatic, and if the document size is not the specified size and print ratio selection is not set to automatic, changes print ratio selection to automatic and then enables the rotating collation function.

As a result, the settings for using the rotating collation function are automatically corrected, misprints can be prevented, and the operating burden of the user is reduced.

Further preferably in another aspect of the invention, the printing device also has multiple paper exits including a face-down paper exit; the setting unit, when the first paper and the second paper are set in paper feed ports, setting the rotating collation function to enabled if the paper exit is set to the face-down paper exit, and if the paper exit is not set to the face-down paper exit, changing the paper exit setting to the face-down paper exit, and then enabling the rotating collation function.

As a result, the settings for using the rotating collation function are automatically corrected, misprints can be prevented, and the operating burden of the user is reduced.

Further preferably in another aspect of the invention, the printing device also has memory configured to store report information to present to a user; the setting unit, when changing a setting, storing the changed setting in the memory as the report information to present.

This configuration enables reporting to the user parameter settings (printing conditions) that were changed on the printer.

Further preferably in another aspect of the invention, the setting unit presents the report information stored in memory to the user.

This configuration enables the user to easily know what parameter settings (printing conditions) were changed on the printer.

Further preferably in another aspect of the invention, when the specified sizes include a first size and a second size, and first paper and second paper of the first size, and first paper and second paper of the second size, are set in paper feed ports, the size of the paper using the rotating collation function is set to either the first size or the second size based on the size of the document.

This configuration further improves user convenience in rotating collation printing because both paper of a first size and paper of a second size can be used for rotating collation printing.

Further preferably in another aspect of the invention, when printing multiple print jobs for which the rotating collation function is enabled are queued for processing, printing the first copy of the second print job, which is executed next after a first print job in which the number of copies is odd, starts by using a paper feed port that feeds the paper in a different orientation than the paper feed port used to print the first copy of the first print job.

This configuration makes finding the end of the first print job and the beginning of the second print job easier.

Further preferably in another aspect of the invention, the setting is changed when the user of the second print job is different from the user of the first print job.

This configuration helps prevent one user from mistakenly taking output intended for a second user.

Further preferably in another aspect of the invention, the printing device also has an inkjet line head; and the setting unit does not set the rotating collation function to enabled when ink is not ejected from nozzles on at least one end of the line head.

This configuration can prevent printing defects such as misprints at the edges of the paper.

To achieve the foregoing objective, another aspect of the invention is a control method of a printing device having a rotating collation function, multiple paper feed ports configured to feed paper, and an acquisition unit configured to acquire a user request, including: enabling the rotating collation function when the acquisition unit acquires a user request to enable the rotating collation function, a first paper of a specified size that is fed in a landscape orientation and a second paper of the specified size that is fed in a portrait orientation are set in multiple paper feed ports, and paper feed port selection is set to automatic.

To achieve the foregoing objective, another aspect of the invention is an information processing device configured to generate print data including printing conditions that is processed by a printing device having a rotating collation function, including: a decision unit configured to determine the printing conditions based on user instruction; and a setting unit configured to enable or disable the rotating collation function; the setting unit setting the rotating collation function to enabled when the setting unit acquires a user instruction to enable the rotating collation function, the paper size condition included in the printing conditions is set by the setting unit to a predetermined specified size, and the paper feed port selection condition included in the printing conditions is set to automatic.

This aspect of the invention can prevent misprints when printing using the rotating collation function, and can produce printouts as desired by the user, thereby improving user convenience when using the rotating collation function, even when executing print commands from a host device.

Further preferably in another aspect of the invention, the setting unit, when the paper size set by the setting unit is not the specified size, sets the paper size condition to the specified size, and then enables the rotating collation function.

As a result, the settings for using the rotating collation function are automatically corrected, misprints can be prevented, and the operating burden of the user is reduced.

Further preferably in another aspect of the invention, the setting unit storing setting the paper size condition to the specified size as report information to report to a user, and presenting the report information to the user at a specific time.

This configuration enables the user to easily know what parameter settings have changed by means of an information processing device.

To achieve the foregoing objective, another aspect of the invention is an information processing method of print data including printing conditions that is processed by a printing device having a rotating collation function, including: setting the condition of the rotating collation function included in the printing conditions to enabled when a user instruction to enable the rotating collation function is acquired, the paper size condition included in the printing conditions is set to a predetermined specified size, and the paper feed port selection condition included in the printing conditions is set to automatic.

To achieve the foregoing objective, another aspect of the invention is a non-transitory computer-readable recording medium recording an information processing program causing a computer to generate print data including printing conditions that is processed by a printing device having a rotating collation function, the program causing the computer to execute a process of: setting the rotating collation function to enabled when a user instruction to enable the rotating collation function is acquired, the paper size condition included in the printing conditions is set to a predetermined specified size, and the paper feed port selection condition included in the printing conditions is set to automatic.

Other objects and attainments together with a fuller understanding of the invention will become apparent and appreciated by referring to the following description and claims taken in conjunction with the accompanying drawings.

DESCRIPTION OF EMBODIMENTS

Figure 1:
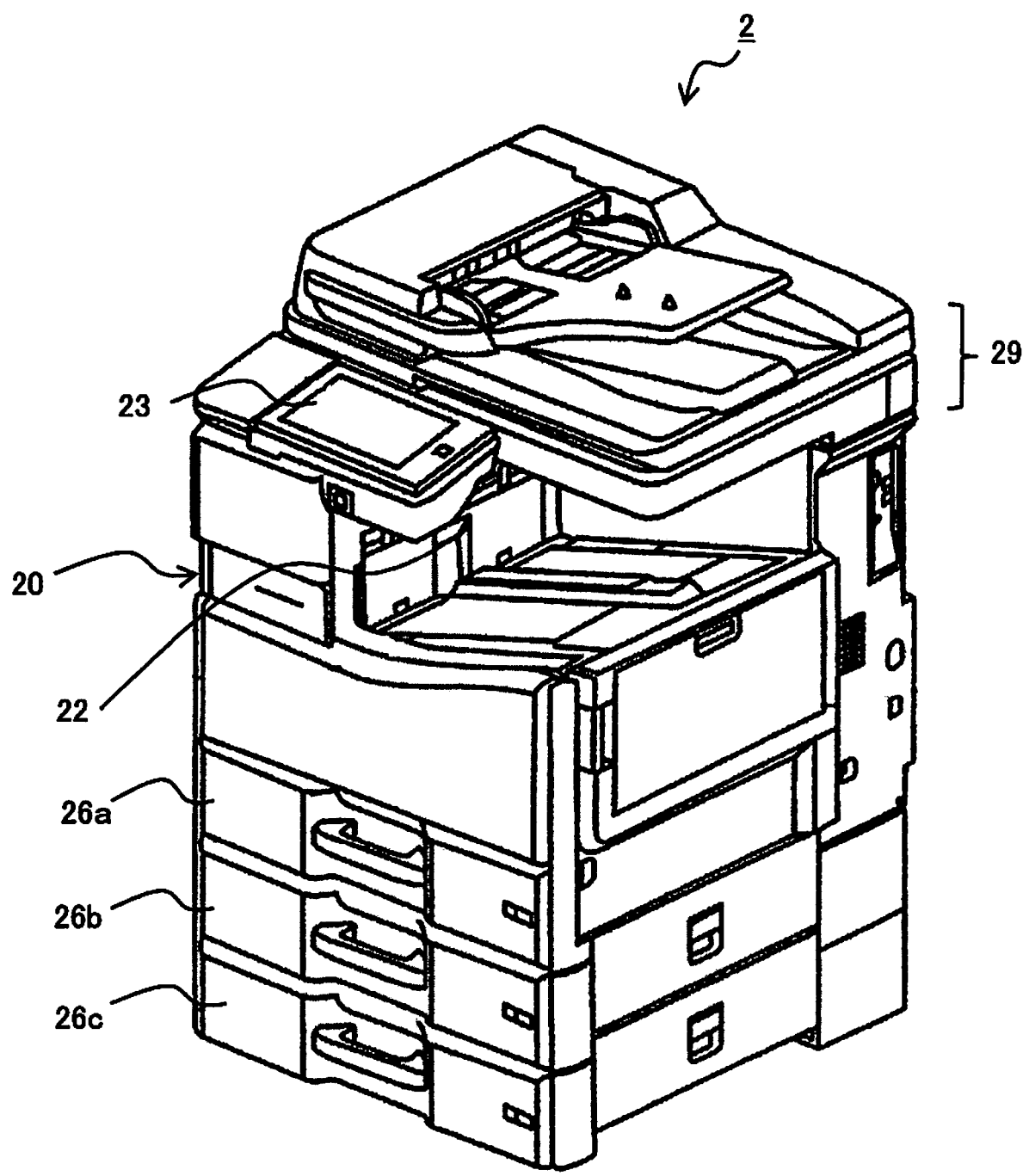
FIG. 1 is an external oblique view of a printer according to the invention.

A preferred embodiment of the invention is described below with reference to the accompanying figures. However, the embodiment described below does not limit the technical scope of the invention. Note that in the figures like or similar parts are identified by the same reference numerals or reference symbols.

Note that a multifunction printer as described below is an apparatus (device) incorporating the functions of a printer, scanner, and fax machine in a single unit. The rotating collation function is also referred to as a rotate sort function, and refers to a function that, when printing multiple sets of a document (which may be even a single page), discharges each set rotated 90 degrees from the previous set.

For example, when the multifunction printer produces three copies of a one-page document, the first copy is discharged in landscape orientation, the second copy is discharged in portrait orientation, and the third copy is discharged in landscape orientation, so that the documents are individually separated. Note that collation may start with the first copy discharged in portrait orientation instead of landscape orientation. However, when printing with a line head, printer throughput is higher when the first set is output in landscape orientation.

FIG. 1 is an external oblique view of a printer according to the invention. The printer 2 shown in FIG. 1 embodies the technology of the invention. This printer 2 is a relatively large multifunction printer that is typically used in offices or retail environments such as convenience stores.

When the printer 2 is used as a copier, for example, the user may place multiple document pages to be copied in an ADF (Automatic Document Feeder). When the user then asserts a Copy command on the operating panel 23, the ADF feeds the loaded document one sheet at a time, and the scanner 29 sequentially scans (captures image data of) each fed document (sheet). The printer 2 then sequentially prints the image data on the paper (medium) fed in (supplied) from the paper supply (paper cassette) 26. When printing (copying) to the paper is completed, the paper is discharged to a face-down paper exit 22, or a face-up paper exit 20.

Furthermore, when used in an office environment, the printer 2 prints according to print requests from a host computer 1, and more specifically receives print data from a host computer 1 and prints according to the print data.

The printer 2 in this embodiment of the invention has a rotating collation function. The printer 2, and the driver 13 of the host computer 1 described below, when a command to enable the rotating collation function is received, checks the settings required for rotating collation printing. If the conditions for enabling the rotating collation function are not met, the printer 2 and driver 13 change settings so that the required conditions are met. This can prevent misprints when printing using the rotating collation function, and can print with the results desired by the user. User convenience is also improved in rotating collation printing.

Figure 2:
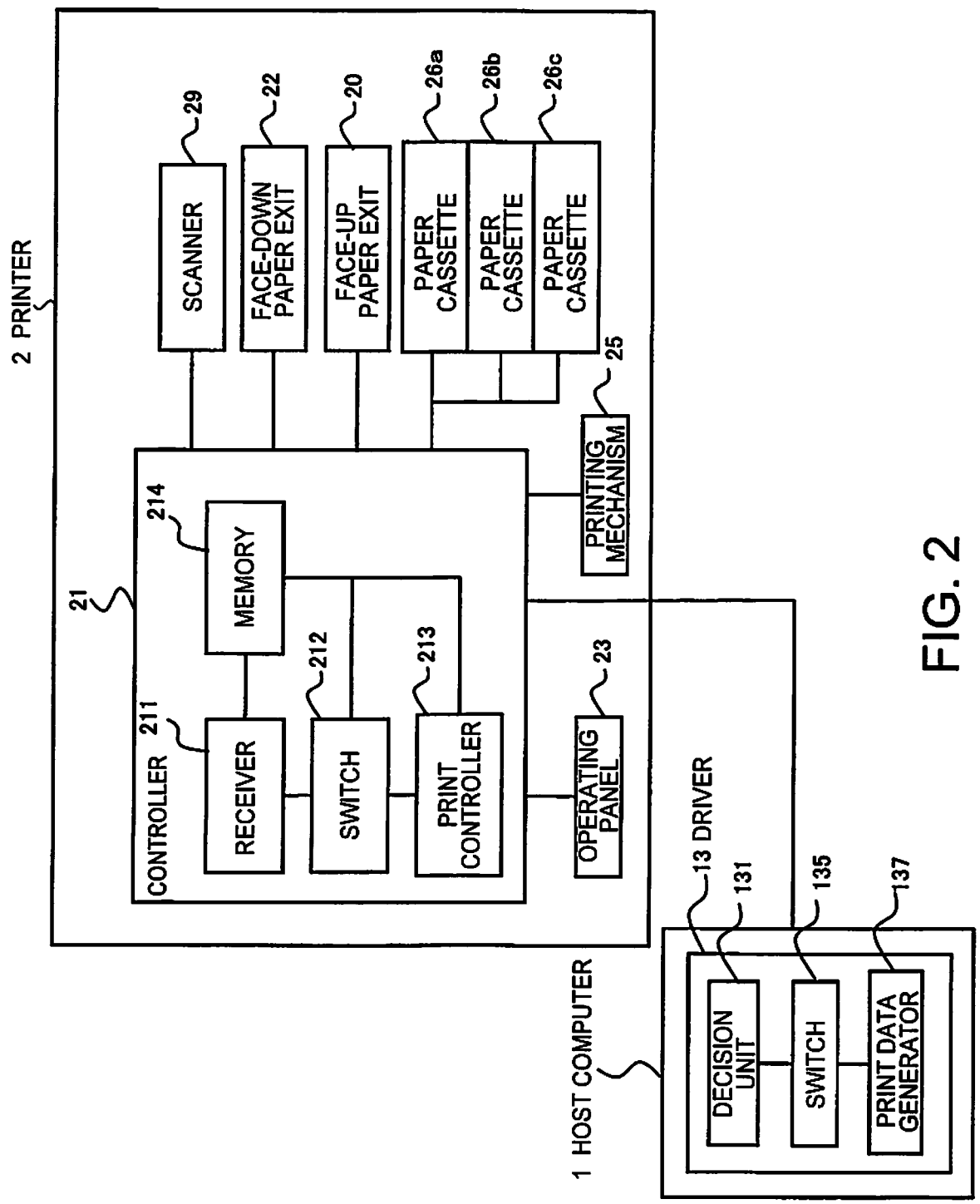
FIG. 2 is a block diagram illustrating the configuration of a host computer 1 and printer 2 according to the invention.

FIG. 2 is a block diagram schematically illustrating the host computer 1 and printer 2.

The host computer 1 is the host device of the printer 2, and in this example is a personal computer including, not shown, a CPU, RAM, hard disk drive, display communicator, and operating device not shown. The functional configuration of the host computer 1 includes, as shown in FIG. 2, a driver 13.

The driver 13 embodies the driver function for a printer 2, and in response to a request from an application not shown, generates and sends print data to the printer 2. The driver 13 also has functionality for setting printing parameters for the printer 2. More specifically, in response to user operation of the host computer 1, the paper size, color/gray scale, paper orientation, print quality, and other printing parameters are set. The defined printing parameters and the image data to print are converted to commands, and sent as print data to the printer 2. The driver 13 displays a user interface (operating screen) enabling user operations for setting the printing parameters on the display screen (such as a monitor) of the host computer 1. As shown in FIG. 2, the driver 13 has a decision unit 131, switch 135 (second setting unit), and print data generator 137.

Note that the driver 13 is embodied by a program defining the processes the execute, and a CPU, for example, executing the program.

The decision unit 131 sets the printing parameters, and based on user instructions input through the user interface, determines and stores the settings of the printing parameters.

When a request to turn the rotating collation function on is received from the decision unit 131, the switch 135 changes the settings as needed so that the printing parameters of the printer 2 are appropriate to rotating collation printing.

When the user turns rotating collation on (enables rotating collation), the command content is passed from the decision unit 131 to the switch 135, and the switch 135 changes the rotating collation function to ON. At this time the switch 135 may also change other printing parameters (such as the paper size, paper cassette 26 selection, printing ratio, and paper exit).

The print data generator 137 generates the print data using commands for the printer 2 (executes a print data generating process).

Note that the decision unit 131, switch 135, and print data generator 137 are embodied by, not shown in the figures, a driver program stored by the host computer 1, a CPU that executes processes according to the program, and RAM or other storage in which the program and data to process are loaded.

The printer 2 in this example is a relatively large multifunction printer used in an office environment or retail environment such as a convenience store. The printer 2 has a rotating collation printing function as described above. As shown in FIG. 2, the functional configuration of the printer 2 includes a controller 21, operating panel 23, printing mechanism 25, paper feed port (paper cassette) 26 (26a, 26b, 26c), scanner 29, face-up paper exit 20, and face-down paper exit 22. The printer 2 in this example is an inkjet line printer.

The controller 21 controls other parts of the printer 2. When a print request is received from the host computer 1, the controller 21 executes a process according to the commands contained in the print data transmitted from the host computer 1.

When the printer 2 functions as a scanner, the controller 21 captures the content of the document on the scanner platen as image data.

When functioning as a copier, the controller 21 captures the content of the document on the scanner platen as image data, and then prints based on the captured image data.

When functioning as a fax machine, the controller 21 captures the content of the document to transmit as image data, and then transmits the image data to the specified telephone number.

As shown in FIG. 2, the functional configuration of the controller 21 includes a receiver 211 (acquisition unit), switch 212 (first setting unit), memory 214, and print controller 213.

While not shown in the figures, hardware components of the controller 21 may include a CPU, ROM, RAM, ASIC, or other device.

The receiver 211 receives information input (user requests) through the operating panel 23 described below. For example, when the user executes a Copy operation through the LCD panel of the operating panel 23 of the printer 2, the printing conditions set at that time are stored to memory 214, and the content of the printing conditions is passed to the switch 212.

When a request to turn the rotating collation function on is received from the receiver 211, the switch 212 changes the printing conditions of the printer 2 to the settings appropriate to rotating collation printing. As may be required at this time, the switch 212 may also change printing conditions other than the conditions for rotating collation printing, such as the paper size, paper feed port (paper cassette) 26 selection, print ratio, or paper exit setting).

The values (settings) that are set for the printing conditions are stored in memory 214. Default factory settings are initially stored, and these may then be changed by the user through the operating panel 23. The memory 214 in this example is nonvolatile memory such as NVRAM.

Note that the receiver 211 and switch 212 are embodied by a program (firmware) stored in printer 2 ROM (not shown in the figure), and a CPU, for example, that runs the program.

The print controller 213 controls printing by the printer 2. When a print request is received from the host computer 1, the print controller 213 interprets commands in the print data received from the host computer 1, and renders image data for each pixel to print according to the commands. The print controller 213 then passes the rendered image data to the printing mechanism 25 for printing.

When the printer 2 functions as a copier, the print controller 213 generates the same type of image data based on the content of the document scanned and the printing conditions stored in memory 214, and passes the resulting image data to the printing mechanism 25 for printing.

The operating panel 23 is the user interface of the printer 2, and has a display panel for presenting information to the usr, and an operating panel for receiving input from the user. The user uses the operating panel 23 to edit the print settings of the printer 2. The display panel may include LEDs that may light steady or blink, and an LCD for presenting simple text information, and the operating panel may include buttons, a touch panel, or other input means. When a setting required to use the rotating collation function changes, the operating panel 23 presents an appropriate notice on the display panel.

The scanner 29 reads (scans) the content of a loaded document, and has an ADF. The ADF feeds the loaded documents one sheet at a time to the scanning position.

The face-down paper exit 22 is the paper exit to which pages are discharged with the printed side facing down.

The face-up paper exit 20 is the paper exit to which pages are discharged with the printed side facing up.

The paper feed port (paper cassette) 26 is a means of feeding paper to the printing position, and the printer 2 in this example has multiple (specifically, three in this example) paper feed ports (26a, 26b, 26c). A cassette in which paper is stored (set) is inserted to each paper feed port 26a, paper feed port 26b, and paper feed port 26c, and the paper is supplied from each cassette. This printer 2 has paper feed ports (paper cassettes) 26 for storing (holding) paper (first paper) that is supplied in a portrait orientation, and paper (second paper) that is supplied in a landscape orientation.

The printing mechanism 25 is the section that executes the printing process on the paper as controlled by the print controller 213. The printing mechanism 25 has a printhead (a line head in this example) with multiple nozzles for ejecting ink onto the paper. The printing mechanism 25 also includes a conveyance mechanism including conveyance rollers, drive devices, and a conveyance path (all not shown), and conveys the paper to the printing position and discharges the printed paper to the face-down paper exit 22 by means of the conveyance mechanism.

A feature of the printer 2 and driver 13 of the host computer 1 thus comprised is the process executed when rotating collation printing is enabled, and the specific content of this process and steps in the process are described below.

The process of enabling the rotating collation function is described below when the printer 2 is used in the copier mode, and when a print request from the host computer 1 is received. The process when the printer 2 is used in the copier mode is described first.

Figure 3:
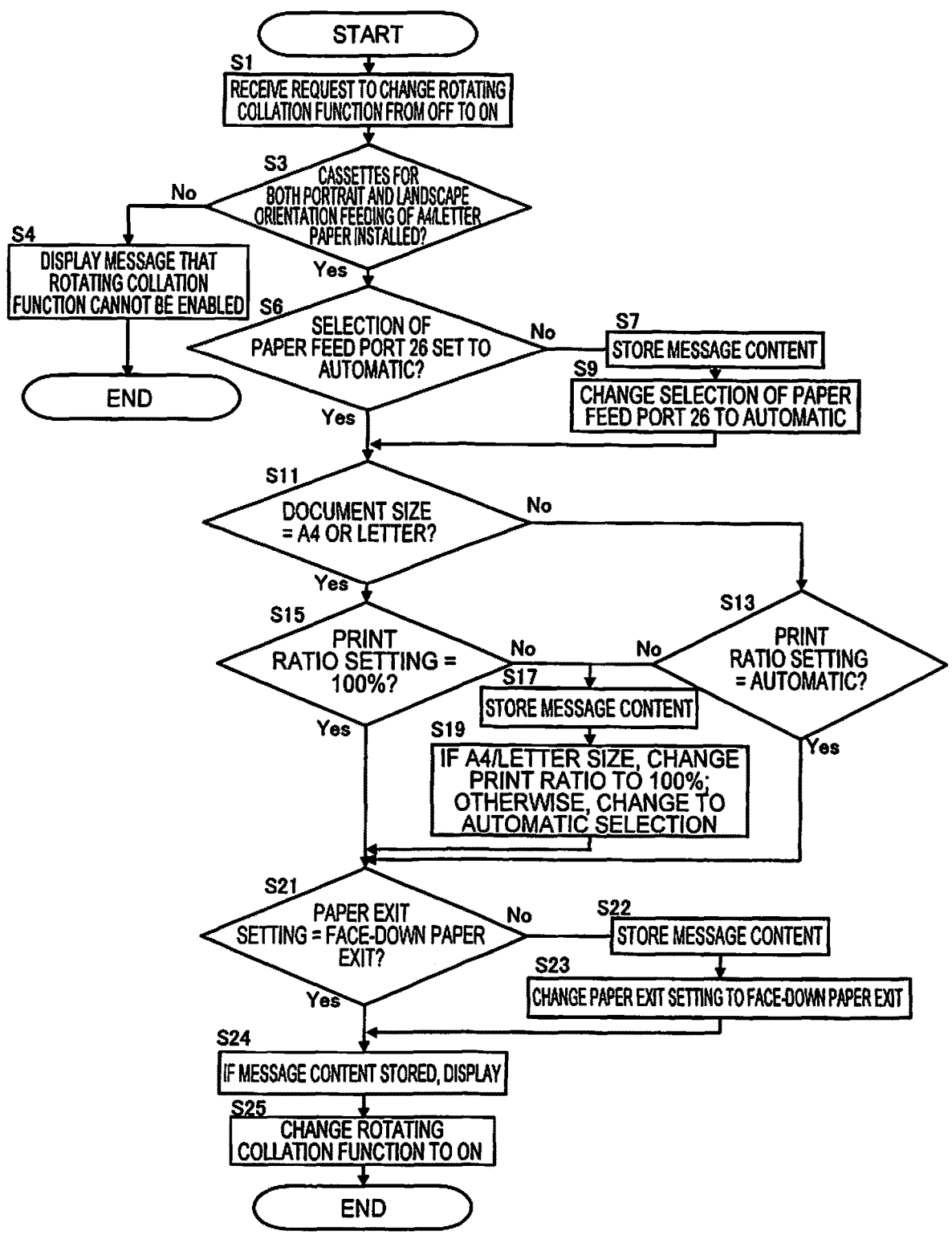
FIG. 3 is a flow chart of a process whereby a switch 212 of the printer 2 changes the setting of the rotating collation function.

FIG. 3 is a flow chart showing the procedure executed by the switch 212 of the printer 2 to change the rotating collation function setting.

First, the user places the page (document) (such as an A4 size document) in the scanner 29, and sets the desired printing conditions through the user interface presented on the operating panel 23. More specifically, the user inputs settings for printing conditions such as the copy color, paper feed port (paper cassette), paper exit, number of copies, and print ratio. In this example, the user sets the copy color to color copy, the number of copies to 5, the paper feed port to paper feed port (paper cassette) 26b, the print ratio to 100% (same size), and the paper exit to face-up. The user then changes the rotating collation function from off (disabled) to on (enabled) and presses the Start Copy button to start copying. When this operation ends, the receiver 211 receives the user-defined printing conditions (settings). As a result, the receiver 211 receives a request to change the rotating collation function to On (step S1 in FIG. 3). Next, the receiver 211 stores the received settings in memory 214. More specifically, the receiver 211 changes the settings that are already stored in memory 214.

Receipt of a request to change the rotating collation function to On is then reported from the receiver 211 to the switch 212. The switch 212 then starts a process of checking if the settings of the printing conditions are appropriate to the rotating collation function.

First, the switch 212 checks the status of the paper feed port (paper cassette) 26 (step S3 in FIG. 3). More specifically, the switch 212 queries a monitor (not shown in the figure) of the paper feed ports (paper cassettes) 26 (26a, 26b, 26c) installed in the printer 2, and checks if both a paper feed port (paper cassette) 26 that feeds paper of a specific size (such as A4 or Letter) in the portrait orientation, and a paper feed port (paper cassette) 26 that feeds the paper in a landscape orientation, are both installed. In other words, the switch 212 determines if both A4/Letter paper fed in the portrait orientation, and A4/Letter paper that fed in the landscape orientation, are loaded in a paper feed port (paper cassette) 26.

If both a paper feed port (paper cassette) 26 that feeds paper of a specific size in the portrait orientation, and a paper feed port (paper cassette) 26 that feeds paper of the specific size in a landscape orientation, are not installed (step S3 in FIG. 3: No), the switch 212 displays a message indicating the rotating collation function cannot be turned On on the operating panel 23 to inform the user (step S4 in FIG. 3). Next, the rotating collation function is turned off (in this case, remains off).

If in step S3 both a paper feed port (paper cassette) 26 that feeds paper of a specific size in the portrait orientation, and a paper feed port (paper cassette) 26 that feeds paper of the specific size in a landscape orientation, are installed (step S3 in FIG. 3: Yes), control goes to step S6, and the switch 212 checks if the selection setting of the paper feed port (paper cassette) 26 (the paper feed port selection) is set to Automatic Selection (step S6 in FIG. 3). More specifically, the switch 212 checks the paper feed port (paper cassette) 26 setting stored in memory 214.

As described above, the paper feed port (paper cassette) 26 in this example is paper feed port (paper cassette) 26b, that is, is not set to Automatic Selection, (step S6 in FIG. 3: No). The switch 212 therefore stores in memory 214 the content of the message displayed in step S24 described below (a message indicating that the paper feed port (paper cassette) 26 setting was changed to Automatic Selection) (step S7 in FIG. 3), and changes the paper feed port (paper cassette) 26 setting to Automatic Selection (step S9 in FIG. 3). In other words, the switch 212 updates the setting stored in memory 214. Control then goes to step S11.

However, if the paper feed port (paper cassette) 26 setting is set to Automatic Selection (step S6 in FIG. 3: Yes), control goes directly to step S11.

In step S11, the switch 212 determines if the paper size of the document is the same as the specified size (step S11 in FIG. 3). More specifically, the switch 212 checks the size of the document set in the scanner 29.

As described above, this example supposes the document size is A4 and is the specified size (step S11 in FIG. 3: Yes). Control therefore goes to step S15, and the switch 212 checks if the print ratio is set to 100% (step S15 in FIG. 3). More specifically, the switch 212 checks the current setting stored in memory 214. If the print ratio is set to 100% (step S15 in FIG. 3: Yes), control goes to step S21.

If the print ratio is not set to 100% (step S15 in FIG. 3: No), control goes to step S17. The switch 212 therefore stores in memory 214 the content of the message displayed in step S24 described below (a message reporting that the print ratio setting was changed to 100%) (step S17 in FIG. 3), and changes the print ratio setting was changed to 100% (step S19 in FIG. 3). Control then goes to step S21.

If in step S11 the paper size of the scanned document is not the specified size (step S11 in FIG. 3: No), control goes to step S13, and the switch 212 checks if the print ratio is set to Automatic Ratio Selection (step S13 in FIG. 3). More specifically, the switch 212 checks the setting stores in memory 214. If in step S13 the print ratio is set to Automatic Ratio Selection (step S13 in FIG. 3: Yes), the process goes to step S21. If the print ratio is not set to Automatic Ratio Selection (step S13 in FIG. 3: No), the process goes to step S17. The switch 212 therefore stores in memory 214 the content of the message displayed in step S24 described below (a message indicating that the print ratio setting was changed to Automatic Ratio Selection) (step S17 in FIG. 3), and changes the print ratio setting to Automatic Ratio Selection (step S19 in FIG. 3). Control then goes to step S21.

In step S21, the switch 212 determines if the paper exit to which the paper is discharged is set to the face-down paper exit 22 (step S21 in FIG. 3). More specifically, the switch 212 checks the current paper exit setting stored in memory 214.

As described above, this example supposes that the paper exit is set to the face-up paper exit 20 (step S21 in FIG. 3: No). The process therefore goes to step S22. The switch 212 therefore stores in memory 214 the content of the message displayed in step S24 described below (a message reporting that the paper exit setting was changed to face-down) (step S22 in FIG. 3). The switch 212 then changes the paper exit setting stored in memory 214 to the face-down paper exit 22 (step S23 in FIG. 3). Control then goes to step S24.

However, if in step S21 the paper exit is set to the face-down paper exit 22 (step S21 in FIG. 3: Yes), the process goes to step S24.

In step S24, the switch 212, if there is a printing condition of which the setting was changed in step S9, step S19, or step S23, the message content stored in step S7, step S17, and step S22 is collectively reported to the user (step S24 in FIG. 3). More specifically, the switch 212 displays the report content on the display panel of the operating panel 23. For example, because settings were changed in step S9 and step S23 based on the suppositions described above, the switch 212 displays a message on the operating panel 23 indicating that the paper feed port (paper cassette) was changed to Automatic Selection, and the paper exit was changed to face-down. Note that this message may be reported audibly to the user.

Next, because all settings required for rotating collation printing have been completed, the switch 212 changes the setting of the rotating collation function to On (step S25 in FIG. 3). That is, the switch 212 changes the setting of the rotating collation function stored in memory 214 to On.

Based on the print data and printing conditions confirmed by the above processes, the print controller 213 then controls the printing mechanism 25 to execute the printing process.

The switch 212 of the printer 2 thus changes the settings related to the rotating collation function (enables the rotating collation function).

The process of changing the setting of the rotating collation function when a print request is received from the host computer 1 is described next.

Figure 4:
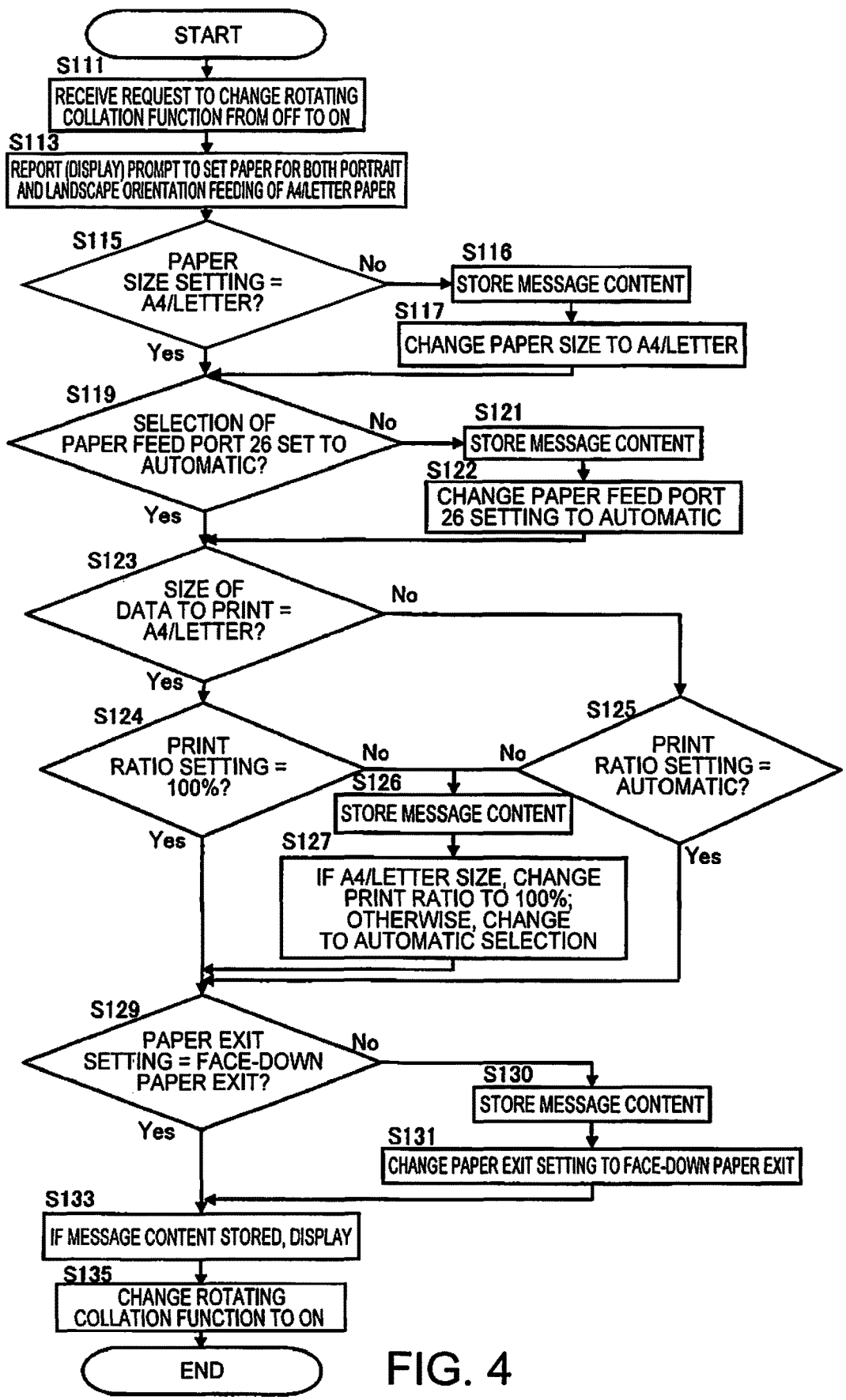
FIG. 4 is a flow chart of a process whereby a switch 135 of the host computer 1 changes the setting of the rotating collation function.

FIG. 4 is a flow chart showing the procedure executed by the switch 135 of the host computer 1 to change the rotating collation function setting.

First, the user sets the printing conditions for printing from an application (not shown in the figure) on the host computer 1. More specifically, the decision unit 131 of the driver 13 displays a user interface enabling setting printing conditions on the display device (such as a monitor) of the host computer 1. In this example, the user, through the user interface, sets the paper size to A4, printing to color printing, the number of copies to 5, the paper feed port to paper feed port (paper cassette) 26b, the print ratio to 100%, and the paper exit to face-up. Next, the user turns the rotating collation function On (enabled), and operates the Print button.

When this operation is completed, the decision unit 131 receives the printing conditions (settings) set by the user. As a result, the decision unit 131 receives a request to change the rotating collation function from Off to On (step S111 in FIG. 4). The decision unit 131 then stores the received settings.

Receipt of a request to change the rotating collation function from Off to On is then reported from the decision unit 131 to the switch 135. The switch 135 then starts a process of checking if the printing conditions are configured appropriately to the rotating collation function.

First, the switch 135 displays a message prompting the user to prepare a paper feed port (paper cassette) 26 (step S113 in FIG. 4). More specifically, the switch 135 checks if paper cassettes for both feeding A4/Letter paper in the portrait orientation, and A4/Letter paper in the landscape orientation, are installed, and if not, displays in the user interface a message prompting the user to install the required paper cassettes. For example, the switch 135 may display on the user interface a message asking "are a paper cassette for supplying paper in the portrait orientation, and a paper cassette for supplying paper in the landscape orientation, both installed?"

Next, the switch 135 if the paper size setting included in the print job set by the decision unit 131 is the specified size (step S115 in FIG. 4).

Because in this example the set paper size is the specified size (A4) (step S115 in FIG. 4: Yes), the process goes to step S119.

However, if the set paper size is not the specified size (A4 or Letter) (step S115 in FIG. 4: No), the switch 135 stores in the decision unit 131 the content of the message displayed in step S133 described below (a message indicating that the paper size setting was changed to A4) (step S116 in FIG. 4), and changes the paper size setting to A4 (step S117 in FIG. 4).

Control then goes to step S119. In step S119, the switch 135 checks if the selection setting of the paper feed port (paper cassette) 26 (the paper feed port selection) is set to Automatic Selection (step S119 in FIG. 4). More specifically, the switch 135 checks the paper feed port (paper cassette) 26 setting included in the print job. In this example the paper feed port (paper cassette) 26 setting is the paper feed port (paper cassette) 26b as described above, and is not set to Automatic Selection (step S119 in FIG. 4: No). The switch 135 therefore stores in decision unit 131 the content of the message displayed in step S133 described below (a message indicating that the paper feed port (paper cassette) 26 setting was changed to Automatic Selection) (step S121 in FIG. 4). Next, the switch 135 changes the paper feed port (paper cassette) 26 setting to Automatic Selection (step S122 in FIG. 4). Control then goes to step S123.

However, if the paper feed port (paper cassette) 26 setting is set to Automatic Selection (step S119 in FIG. 4: Yes), control goes directly to step S123.

In step S123, the switch 135 determines if the paper size of the digital data to print is the same as the specified size (A4 or Letter) (step S123 in FIG. 4). More specifically, the switch 135 checks the size of the digital data to be printed contained in the print job.

If the paper size of the digital data to print contained in the print job is the specified size (A4 or Letter) (step S123 in FIG. 4: Yes), control goes to step S124, and the switch 135 checks if the print ratio is 100% (step S124 in FIG. 4). More specifically, the switch 135 checks the current setting of the print ratio set by the decision unit 131 and contained in the print job. This example supposes that the print ratio is set to 100% (step S124 in FIG. 4: Yes), and control goes to step S129.

If the print ratio is not set to 100% (step S124 in FIG. 4: No), control goes to step S126. The switch 135 then stores in decision unit 131 the content of the message displayed in step S133 described below (a message indicating that the print ratio was changed to 100%) (step S126 in FIG. 4), and changes the print ratio to 100% (step S127 in FIG. 4). Control then goes to step S129.

If in step S123 the paper size of the digital data contained in the print job to print is not the specified size (step S123 in FIG. 4: No), control goes to step S125, and the switch 135 checks if the print ratio is set to Automatic Ratio Selection (step S125 in FIG. 4). More specifically, the switch 135 checks the current setting set by the decision unit 131 and contained in the print job. If in step S125 the print ratio is set to Automatic Ratio Selection (step S125 in FIG. 4: Yes), control goes to step S129.

As described above, this example supposes that the print ratio is 100% and not set to Automatic Ratio Selection (step S125 in FIG. 4: No), and control therefore goes to step S126. The switch 135 then stores in decision unit 131 the content of the message displayed in step S133 described below (a message indicating that the print ratio was changed to Automatic Ratio Selection) (step S126 in FIG. 4), and changes the print ratio to Automatic Ratio Selection (step S127 in FIG. 4). Control then goes to step S129.

In step S129, the switch 135 checks if the paper exit to which the paper will be discharged is set to the face-down paper exit 22 (step S129 in FIG. 4). More specifically, the switch 135 checks the paper exit setting that was set by the decision unit 131 and contained in the print job.

Because this example supposes that the paper exit is set to the face-up paper exit 20 (step S129 in FIG. 4: No), control goes to step S130. The switch 135 then stores in the decision unit 131 the content of the message displayed in step S133 described below (a message indicating that the paper exit setting was changed to face-down) (step S130 in FIG. 4). The switch 135 then changes the paper exit setting stored in the decision unit 131 to the face-down paper exit 22 (step S131 in FIG. 4). Control then goes to step S133.

However, if in step S129 the paper exit is set to the face-down paper exit 22 (step S129 in FIG. 4: Yes), control goes to step S133.

In step S133, the switch 135, if there is a printing condition of which the setting was changed in step S117, step S122, step S127, or step S131, the message content stored in step S116, step S121, step S126, and step S130 is collectively reported to the user (step S133 in FIG. 4). More specifically, the switch 135 presents the message content stored in the decision unit 131 in the user interface of the host computer 1. Because settings were changed in step S122 and step S131 in this example, the switch 135 may display a message in the user interface indicating that the paper feed port (paper cassette) was changed to Automatic Selection, and the paper exit was changed to face-down. Note that this message may be reported audibly to the user.

Next, because all settings required for rotating collation printing have been completed, the switch 212 changes the setting of the rotating collation function to On (step S135 in FIG. 4). That is, the switch 135 changes the setting of the rotating collation function stored in the decision unit 131 to On.

Next, the print data generator 137 generates print data including the settings of the printing conditions set (stored) in the decision unit 131 and the images to print using commands in the command language of the printer 2, and sends the print data to the printer 2. The transmitted print data is then processed and printed by the print controller 213 and printing mechanism 25 of the printer 2.

The switch 135 of the host computer 1 can thus change the setting of (enable) the rotating collation function as described above.

Note that if multiple print jobs configured to use the rotating collation function are queued (stacked) in the printer 2, and the number of copies in the first print job in the queue is odd, the second print job that is printed next may be configured to use different paper feed ports (paper cassettes) 26 than the first print job. In other words, the second print job may be configured so that the paper feed port (paper cassette) 26 used first in the second print job feeds paper in a different orientation than the paper feed port (paper cassette) 26 that is used first in the first print job.

For example, if a paper feed port (paper cassette) 26 that feeds paper in landscape orientation is used when a print job starts, and the print job executed first prints 3 (an odd number) copies (sets), a paper feed port (paper cassette) 26 that feeds paper in portrait orientation is used first at the start of the second print job. This configuration clearly differentiates the printout for the first print job from the printout for the second print job.

This change of setting may also be limited to when different users created the first print job and the second print job. This is because if the same user created both print jobs, little harm results even if the separation between jobs is not readily apparent.

Furthermore, when the specified sizes include A4 (first size) and Letter (second size), and both A4 and Letter size paper are loaded as paper (first paper) fed in portrait orientation and paper (second paper) fed in landscape orientation in paper feed ports (paper cassettes) 26, the paper size used in the rotating collation function may be determined based on the size of the document.

Furthermore, when an ink clog or other problem preventing normal ejection of ink occurs at an end of the printhead (not shown in the figure) of the printing mechanism 25 that executes the printing process, printing defects may occur at the edges of paper printed in the LEF (long edge feed) orientation, and enabling the rotating collation function may be prevented so that all documents are printed in the SEF (short edge feed) orientation.

When the printer 2 and driver 13 of the host computer 1 described above receive a request to enable the rotating collation function, they check various settings that are required for rotating collation printing. If the settings required for the rotating collation function are not met, the printer 2 and driver 13 change the settings as needed so the conditions are met.

As a result, misprints can be prevented when printing with the rotating collation function, printing as desired by the user is possible, and user convenience when using the rotating collation function is improved.

When both paper fed in portrait orientation and paper fed in landscape orientation are not set in any paper feed port (paper cassette) 26, the switch 212 cannot enable the rotating collation function, and misprints when printing using the rotating collation function can be prevented.

Furthermore, because when Automatic Selection of the paper feed port (paper cassette) 26 is not enabled the switch 212 changes the setting to Automatic Selection of the paper feed port (paper cassette) 26 and then enables the rotating collation function, the setting enabling using the rotating collation function is automatically changed to the correct setting, misprints can be prevented, and the operating burden of the user is reduced.

Furthermore, when the document size is a specific size and the print ratio is set to 100%, the switch 212 changes the rotating collation function to enabled. When the document size is a specific size and the print ratio is not set to 100%, the switch 212 changes the print ratio to 100% and changes the rotating collation function to enabled. The settings for using the rotating collation function are therefore automatically corrected, misprints can be prevented, and the operating burden of the user is reduced.

Furthermore, when the document size is not the specified size and the print ratio is set to Automatic Ratio Selection, the switch 212 enables the rotating collation function. As a result, the settings for using the rotating collation function are therefore automatically corrected, misprints can be prevented, and the operating burden of the user is reduced.

When the document size is not the specified size and the print ratio is not set to Automatic Ratio Selection, the print ratio is changed to Automatic Ratio Selection, and then the rotating collation function is enabled. As a result, the same effect as described above is achieved.

When the paper exit is set to the face-down paper exit 22, the switch 212 changes the rotating collation function to enabled. When the paper exit is not set to the face-down paper exit 22, the switch 212 changes the paper exit to the face-down paper exit 22 and then changes the rotating collation function to enabled. As a result, the settings for using the rotating collation function are therefore automatically corrected, misprints can be prevented, and the operating burden of the user is reduced.

Furthermore, when a setting is changed, the switch 212 stores information reporting the setting that changed in memory 214. As a result, the switch 212 can be informed that a setting was changed.

Furthermore, because the switch 212 reports the report information stored in the memory 214 to the user, the user can easily know what parameter settings were changed on the printer 2.

Furthermore, when the specific sizes include A4 and Letter, and both A4 and Letter size paper are loaded as paper fed in portrait orientation and paper fed in landscape orientation in paper feed ports (paper cassettes) 26, rotating collation printing is possible using either A4 or Letter size paper, and user convenience is improved.

If multiple print jobs configured to use the rotating collation function are queued (stacked) for printing, and the number of copies in the first print job in the queue is odd, the second print job that is printed next may be configured to use different paper feed ports (paper cassettes) 26 than the first print job. In other words, the second print job may be configured so that the paper feed port (paper cassette) 26 used first in the second print job feeds paper in a different orientation than the paper feed port (paper cassette) 26 that is used first in the first print job. As a result, the printouts for the second print job can be easily separated from the last printout of the first print job.

Furthermore, because the setting for the second print job is changed when the user that generated the first print job and the user that generated the second print job are different, one user mistakenly taking a printout for another user can be better prevented.

When a problem preventing ink from be normally ejected from an end of the line head occurs, and the paper is fed in landscape (LEF) orientation, ink may not be ejected to the printing side of the conveyed paper along the edges at the end of the line head. The paper is therefore preferably not fed in landscape orientation when ink is not ejected from an end of the line head. As a result, switch 135 and switch 212 preferably do not enable the rotating collation function when a problem preventing ink ejection from the end of the line head occurs. Note that the switch 135 and switch 212 may be configured to not enable the rotating collation function when ink is not ejected from at least one end of the line head.

When the driver 13 of the host computer 1 receives a user command to enable the rotating collation function, if the paper size included in the printing conditions is set to a predetermined specific size, and the paper feed port selection of the printer contained in the printing conditions is set to Automatic Selection, the driver 13 changes the rotating collation function to enabled. As a result, misprints can be prevented when printing with the rotating collation function even when the host computer 1 generates the print commands, printouts as desired by the user can be produced, and user convenience can be improved when using the rotating collation function.

If the set paper size is not the specified paper size when executing a print command from the host computer 1, the paper size setting is changed to the specified size before enabling the rotating collation function. The settings for using the rotating collation function are therefore automatically corrected, misprints can be prevented, and the operating burden of the user is reduced.

Furthermore, because when print data is sent from the host computer 1, information indicating the paper size setting was set to a specific size is stored as report information, and the report information is presented to the user at a specific time. As a result, the user can easily know that a setting was changed by referring to the user interface displayed by the driver 13 of the host computer 1.

The printer 2 described above is an inkjet printer, but may be a laser printer or a printer using another printing method.

Note that the switch 135 and switch 212 described above may also be referred to as a first setting unit 135 and a second setting unit 212.

The receiver 211 may also be referred to as an acquisition unit 211.

The scope of the invention is not limited to the embodiments described above, and includes the invention as described in the following claims and equivalents thereof.

The entire disclosure of Japanese Patent Application No. 2016-225733, filed Nov. 21, 2016 is expressly incorporated by reference herein.

What is claimed is:

1. A printing device having a rotating collation function, comprising:
    multiple paper feed ports configured to feed paper;
    a printing mechanism configured to execute a printing process;
    an operating panel having a display panel;
    a memory configured to store printing conditions including a paper size, a paper feed port selection and a print ratio;
    an acquisition unit configured to acquire a user request to enable the rotating collation function and the printing conditions;
    a setting unit configured to enable or disable the rotating collation function and to change the printing conditions; and
    a print controller configured to control the printing mechanism based on the printing conditions stored in the memory, wherein
    when the acquisition unit acquires the user request to enable the rotating collation function and the printing conditions, the acquisition unit stores the printing conditions in the memory, and
    the setting unit
        determines, prior to enabling the rotating collation function, whether a first paper of a first specified size that is fed in a landscape orientation and a second paper of the first specified size that is fed in a portrait orientation are set in the multiple paper feed ports and whether the paper feed port selection of the printing conditions is set to an automatic selection for automatically selecting a paper feed port,
        changes the paper feed port selection of the printing conditions to the automatic selection while the setting unit determines that the first paper and the second paper are set in the multiple paper feed ports and that the paper feed port selection of the printing conditions is not set to the automatic selection,
        stores report information in the memory when changing the paper feed port selection of the printing conditions, the report information including a message indicating that the paper feed port selection of the printing conditions is changed to the automatic selection,
        reports the report information stored in the memory to a user by presenting the report information on the display panel of the operating panel after the paper feed port selection of the printing conditions is changed by the setting unit, and then
        sets the rotating collation function to enabled.

2. The printing device described in claim 1, wherein
    the setting unit does not set the rotating collation function to enabled if either the first paper or the second paper is not set in the paper feed ports when the acquisition unit acquires the user request to enable the rotating collation function.

3. The printing device described in claim 1, wherein
    when the first paper and the second paper are set in the paper feed ports,
    the setting unit enables the rotating collation function if the paper size is the first specified size and the print ratio is set to 100%, and
        if the paper size is the first specified size and the print ratio is not set to 100%, changes the print ratio to 100%, and then enables the rotating collation function.

4. The printing device described in claim 3, wherein
    when the first paper and the second paper are set in the paper feed ports,
    the setting unit enables the rotating collation function if the paper size is not the first specified size and the print ratio is set to the automatic selection, and
        if the paper size is not the first specified size and the print ratio is not set to the automatic selection, changes the print ratio to the automatic selection, and then enables the rotating collation function.

5. The printing device described in claim 1, further comprising
    multiple paper exits including a face-down paper exit,
    the setting unit, when the first paper and the second paper are set in the paper feed ports, setting the rotating collation function to enabled if the paper exit is set to the face-down paper exit, and
        if the paper exit is not set to the face-down paper exit, changing a paper exit setting to the face-down paper exit, and then enabling the rotating collation function.

6. The printing device described in claim 1, wherein
    when a third paper of a second specified size that is fed in the landscape orientation and a forth paper of the second specified size that is fed in the portrait orientation are set in the multiple paper feed ports,
    the paper size using the rotating collation function is set to either the first specified size or the second specified size based on a size of digital data contained in a print job.

7. The printing device described in claim 1, wherein
    when printings of multiple print jobs for which the rotating collation function is enabled are queued for processing, the multiple print jobs including a first print job and a second print job,
    a printing of a first copy of the second print job, which is executed next after the first print job for which a number of copies is odd, starts by using a second paper feed port that feeds the paper in a different orientation than a first paper feed port used to print the first copy of the first print job.

8. The printing device described in claim 7, wherein
    the printing conditions are changed when a user of the second print job is different from a user of the first print job.

9. The printing device described in claim 1, further comprising
    an inkjet line head,
    the setting unit not setting the rotating collation function to enabled when ink is not ejected from nozzles on at least one end of the inkjet line head.

10. The printing device described in claim 1, wherein
when the setting unit changes the paper feed port selection to the automatic selection, the user is not required to choose which one of the multiple paper feed ports is to feed the paper.

11. An information processing device configured to generate print data including printing conditions that is processed by a printing device having a rotating collation function, comprising:
- a decision unit configured to receive a user instruction to enable the rotation collation function and the printing conditions including a paper size, a paper feed port selection and a print ratio by a user, and to determine the printing conditions based on the user instruction; and
- a setting unit configured to enable or disable the rotating collation function, wherein
when the setting unit acquires the user instruction to enable the rotating collation function and the printing conditions, the setting unit stores the printing conditions in the decision unit, and
the setting unit
- determines, prior to enabling the rotating collation function, whether a first paper of a first specified size that is fed in a landscape orientation and a second paper of the first specified size that is fed in a portrait orientation are set in multiple paper feed ports of the printing device and whether the paper feed port selection of the printing conditions is set to an automatic selection for automatically selecting a paper feed port,
- changes the paper feed port selection of the printing conditions to the automatic selection while the setting unit determines that the first paper and the second paper are set in the multiple paper feed ports and that the paper feed port selection of the printing conditions is not set to the automatic selection,
- stores report information in the decision unit when changing the paper feed port selection of the printing conditions, the report information including a message indicating that the paper feed port selection of the printing conditions is changed to the automatic selection,
- reports the report information stored in the decision unit to the user after the paper feed port selection of the printing conditions is changed by the setting unit, and then
- sets the rotating collation function to enabled.

12. The information processing device described in claim 11, wherein
the setting unit, when the paper size set by the setting unit is not the first specified size, sets the paper size to the first specified size, and then enables the rotating collation function.

13. The information processing device described in claim 12, wherein
the setting unit stores the printing conditions including the paper size being set to the first specified size as report information to report to the user, and presents the report information to the user at a specific time.

14. A non-transitory computer-readable recording medium recording an information processing program causing a computer to generate print data including printing conditions that is processed by a printing device having a rotating collation function, the program causing the computer to execute a process of:
- receiving a user instruction to enable the rotation collation function and the printing conditions including a paper size, a paper feed port selection and a print ratio by a user;
- storing the printing conditions in the user instruction when acquiring the user instruction to enable the rotating collation function;
- determining, prior to enabling the rotating collation function, whether a first paper of a first specified size that is fed in a landscape orientation and a second paper of the first specified size that is fed in a portrait orientation are set in multiple paper feed ports of the printing device and whether the paper feed port selection of the printing conditions is set to an automatic selection for automatically selecting a paper feed port;
- changing the paper feed port selection of the printing conditions to the automatic selection while determining that the first paper and the second paper are set in the multiple paper feed ports and that the paper feed port selection of the printing conditions is not set to the automatic selection;
- storing report information when changing the paper feed port selection of the printing conditions, the report information including a message indicating that the paper feed port selection of the printing conditions is changed to the automatic selection;
- reporting the report information stored to the user after the paper feed port selection of the printing conditions is changed; and then
- setting the rotating collation function to enabled.

* * * * *